(12) United States Patent
Brenner et al.

(10) Patent No.: US 10,244,873 B2
(45) Date of Patent: Apr. 2, 2019

(54) ADJUSTABLE PRODUCT DISPLAY SYSTEM AND METHOD

(71) Applicant: iSee Store Innovations, LLC, St Louis, MO (US)

(72) Inventors: Steve Brenner, St. Louis, MO (US); Mark Schaefer, Town and Country, MO (US); Fiona Lee, New South Wales (AU); Emad Ayad, New South Wales (AU); Leonard Velich, New South Wales (AU)

(73) Assignee: iSee Store Innovations, LLC, St. Louis, MO (US)

( * ) Notice: Subject to any disclaimer, the term of this patent is extended or adjusted under 35 U.S.C. 154(b) by 218 days.

(21) Appl. No.: 14/872,262

(22) Filed: Oct. 1, 2015

(65) Prior Publication Data
US 2017/0095093 A1  Apr. 6, 2017

(51) Int. Cl.
*A47F 3/04* (2006.01)
*A47F 5/00* (2006.01)
*F16M 13/02* (2006.01)
*A47F 3/14* (2006.01)
*F16B 47/00* (2006.01)
*A47F 7/28* (2006.01)
(Continued)

(52) U.S. Cl.
CPC .......... *A47F 3/0426* (2013.01); *A47F 3/0434* (2013.01); *A47F 3/14* (2013.01); *A47F 5/0018* (2013.01); *A47F 5/0025* (2013.01); *A47F 5/0093* (2013.01); *F16M 13/022* (2013.01); *F25D 23/04* (2013.01); *F25D 25/02* (2013.01); *A47B 45/00* (2013.01); *A47F 7/283* (2013.01); *F16B 47/00* (2013.01)

(58) Field of Classification Search
CPC ........ A47F 5/08; A47F 3/0486; A47F 3/0426; A47F 3/14; A47F 7/283; A47F 7/285; A47F 5/0018; A47F 5/0025; B43M 99/008; F25D 2331/803; F25D 2331/809; F25D 23/04
USPC ........................................................ 206/214
See application file for complete search history.

(56) References Cited

U.S. PATENT DOCUMENTS

| | | | | |
|---|---|---|---|---|
| 2,491,652 A | * | 12/1949 | Feerick | A47B 57/58 211/184 |
| 2,650,870 A | * | 9/1953 | Carpenter | B60N 3/002 108/45 |

(Continued)

FOREIGN PATENT DOCUMENTS

| | | | | |
|---|---|---|---|---|
| CN | 203771882 U | * | 8/2014 | ............. F25D 23/04 |
| JP | 2012225445 | | 11/2012 | |
| WO | WO-2016023091 A1 | * | 2/2016 | ............. F25D 23/04 |

OTHER PUBLICATIONS

International Search Report for PCP/US2016/049821 dated Dec. 15, 2016.

*Primary Examiner* — Andrew M Roersma
(74) *Attorney, Agent, or Firm* — Joseph M. Butscher; The Small Patent Law Group, LLC

(57) ABSTRACT

An adjustable product display system is configured to display a variety of products having different sizes and shapes in relation to a surface of a structure. The adjustable product display system may include a bin assembly having an adjustable length. The assembly defines a retaining chamber. At least one product-supporting insert is selectively positioned in and removed from the retaining chamber. The product-supporting insert(s) is configured to retain at least one of the products.

6 Claims, 6 Drawing Sheets

(51) Int. Cl.
*A47B 45/00* (2006.01)
*F25D 25/02* (2006.01)
*F25D 23/04* (2006.01)

(56) References Cited

U.S. PATENT DOCUMENTS

| | | | | |
|---|---|---|---|---|
| 2,705,565 | A * | 4/1955 | Mckirgan | F25D 23/04 211/153 |
| 4,036,369 | A * | 7/1977 | Eisenberg | A47B 45/00 108/102 |
| 4,482,522 | A * | 11/1984 | Baudisch | B01L 9/06 211/72 |
| 4,960,254 | A * | 10/1990 | Hartke | A47G 23/0241 211/74 |
| 4,984,693 | A * | 1/1991 | Belokin, Jr. | A47F 5/0876 211/88.01 |
| 5,036,989 | A * | 8/1991 | Carilli | B01L 9/06 211/60.1 |
| 5,071,002 | A * | 12/1991 | Bradley | A47G 23/0216 206/217 |
| 5,096,272 | A | 3/1992 | Paul | |
| 5,486,044 | A * | 1/1996 | Bennett | A47F 3/0486 211/88.01 |
| 5,702,009 | A * | 12/1997 | Ouellet | A47G 23/0241 211/74 |
| 5,775,521 | A | 7/1998 | Tisbo | |
| 5,875,912 | A * | 3/1999 | Hobson | B43M 99/008 220/4.03 |
| RE36,827 | E | 8/2000 | Belokin | |
| 6,488,256 | B1 | 12/2002 | Wen-Chi | |
| 6,592,092 | B2 * | 7/2003 | Stahlberg | A47G 23/0241 206/217 |
| 6,718,667 | B2 * | 4/2004 | Applebee | G09F 3/203 40/488 |
| 6,899,236 | B2 * | 5/2005 | Yang | A47J 47/16 211/71.01 |
| 2002/0083729 | A1 * | 7/2002 | Skinner | F25C 5/22 62/344 |
| 2003/0160060 | A1 | 8/2003 | Hornblad et al. | |
| 2006/0060549 | A1 | 3/2006 | Robertson | |
| 2008/0028348 | A1 | 11/2008 | Evans | |
| 2008/0283481 | A1 * | 11/2008 | Evans | A47B 77/16 211/74 |
| 2015/0025033 | A1 | 1/2015 | Vranderick et al. | |
| 2015/0250333 | A1 * | 9/2015 | Schaefer | A47F 5/08 211/89.01 |

* cited by examiner

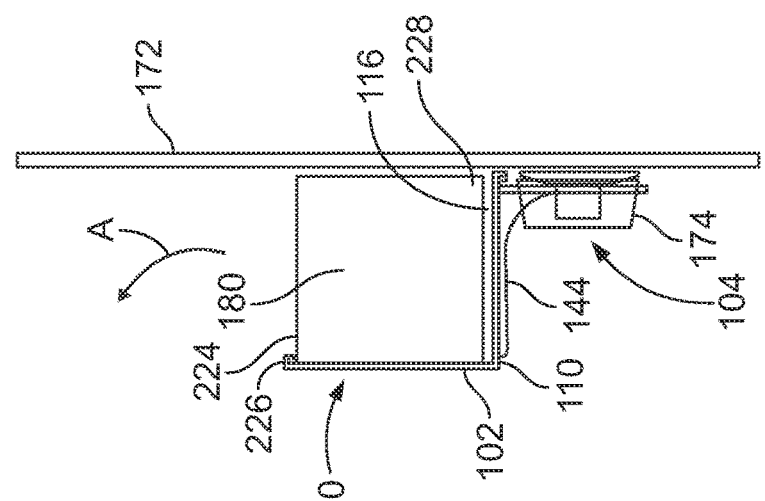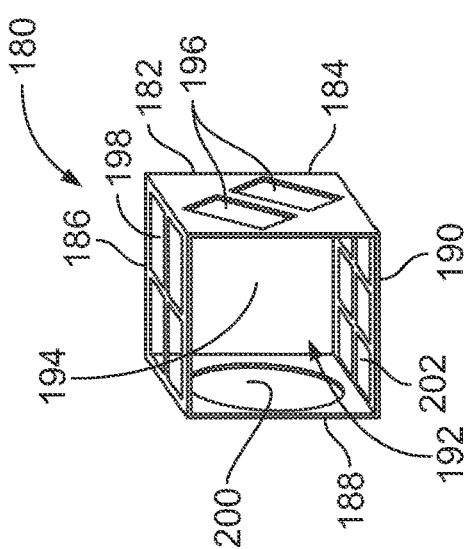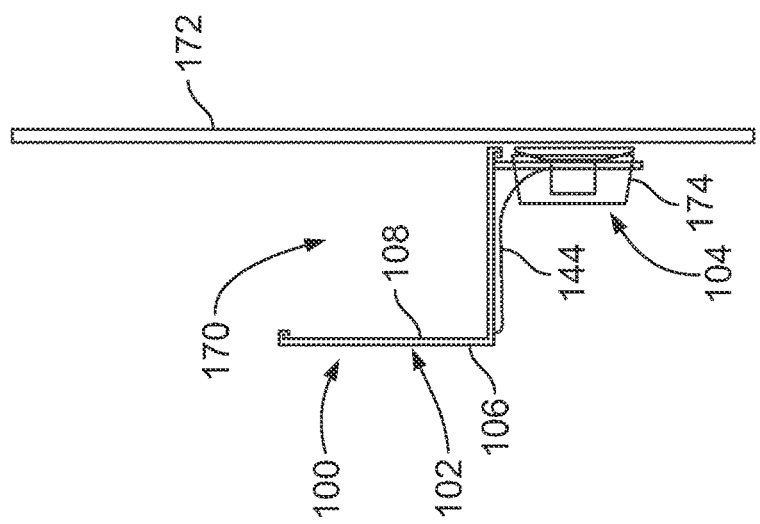

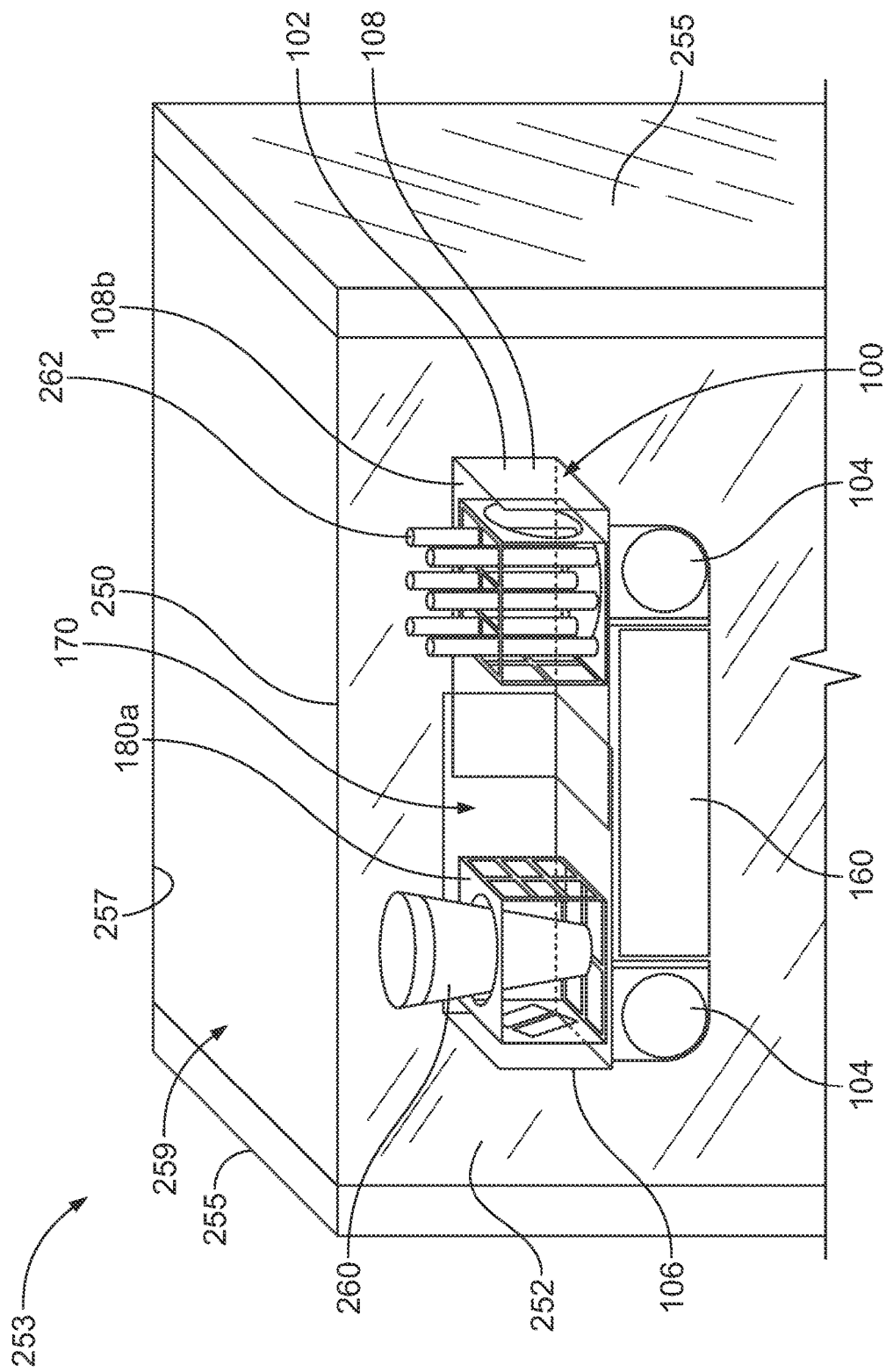

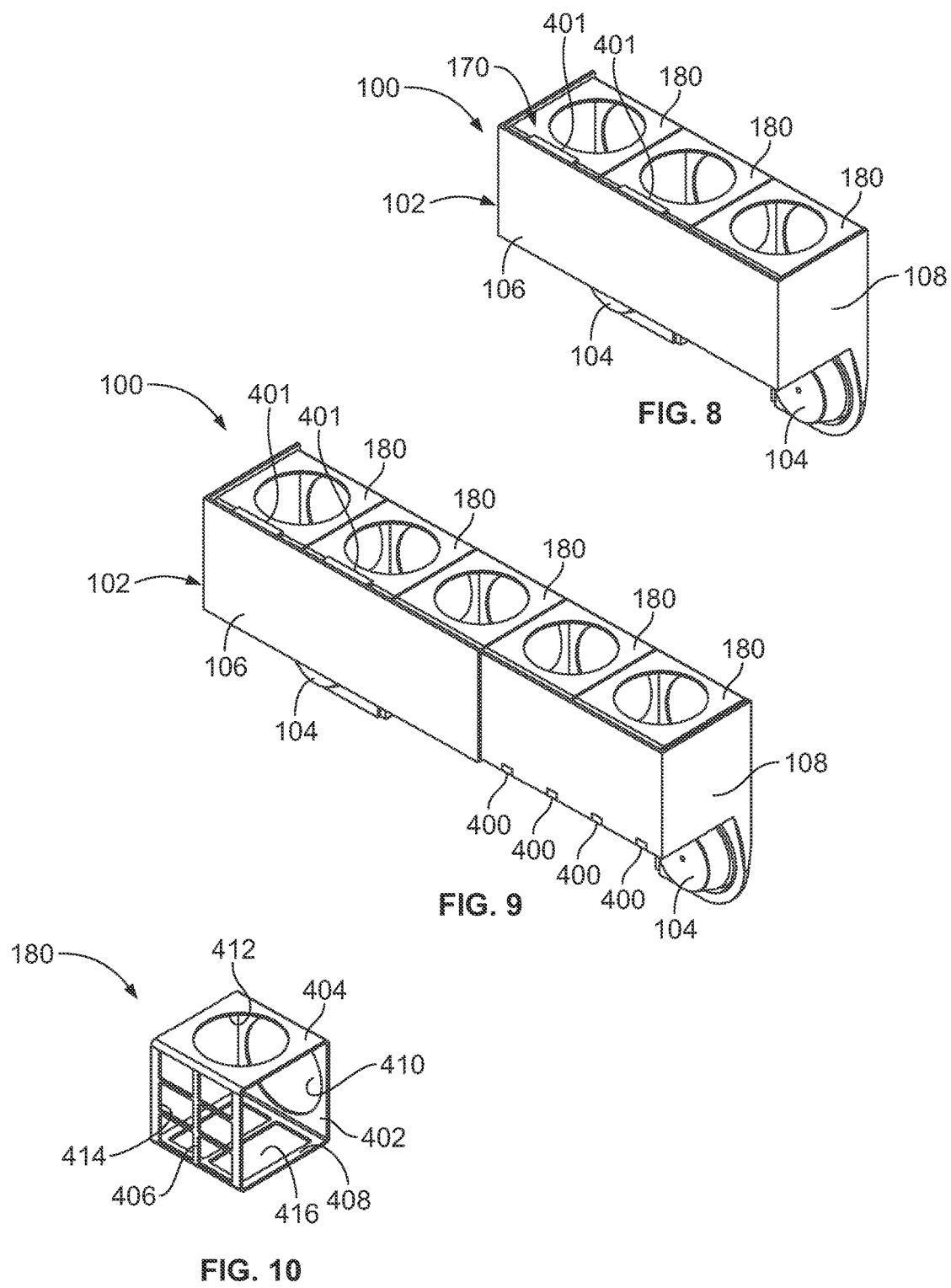

ADJUSTABLE PRODUCT DISPLAY SYSTEM AND METHOD

FIELD OF THE DISCLOSURE

Embodiments of the present disclosure generally relate to systems and methods for displaying products, such as within a refrigerated compartment, and, more particularly, to an adjustable product display assembly that adaptively adjusts to display a variety of different products.

BACKGROUND OF THE DISCLOSURE

Various commercial enterprises offer goods for sale that may be contained within a transparent container. For example, various convenience stores offer refreshments for sale. Some of the refreshments, such as soft drinks, alcoholic beverages, and the like, are refrigerated. Often, the refreshments are contained within a refrigerated compartment having a transparent door (formed of, for example, glass). The transparent door allows a customer to see the types of soft drinks that are available for sale. If the customer chooses to purchase a particular soft drink, the customer opens the door, removes a soft drink within the refrigerated compartment, and then closes the door.

The space within a refrigerated compartment is limited. As such, each refrigerated compartment is able to contain a limited number of products. A known refrigerated compartment includes multiple shelves on which various products are positioned. When the shelf space is fully occupied by product, additional products are not able to be positioned within the refrigerated compartment. Instead, as products within the refrigerated compartment are removed by customers, additional product may then be moved into the open space on the shelf.

As can be appreciated, the additional product that is not within the refrigerated compartment is stored at other areas of an establishment, thereby taking up valuable space. Further, if a large number of products are removed from the refrigerated compartment, the additional products that are used to replenish the refrigerated compartment take time to cool to a desirable temperature.

Additionally, many establishments have a large number of refrigerated compartments that contain products. With increased numbers of refrigerator compartments, doors, and rows, shelves, and the like, retailers and suppliers may find it difficult to distinguish their products from the hundreds of other products on display.

SUMMARY OF THE DISCLOSURE

A need exists for a system and method of accommodating and displaying increased numbers of products within a display container, such as a refrigerated compartment.

Accordingly, certain embodiments of the present disclosure provide an adjustable product display system configured to display a variety of products having different sizes and shapes in relation to a surface of a structure. The adjustable product display system may include a bin assembly having an adjustable length. The bin assembly defines a retaining chamber. At least one product-supporting insert may be selectively positioned in and removed from the retaining chamber. The product-supporting insert(s) is configured to retain at least one of the products.

In at least one embodiment, the bin assembly may include a first bin moveably secured to a second bin. The first bin is moveable relative to the second bin to adjust a length of the retaining chamber. The bin assembly may telescope between different sizes.

The bin assembly may include at least one lock that is configured to cooperate with a structure to lock the product-supporting insert(s) within the retaining chamber. The lock(s) may include an upper lip extending from a wall of the bin assembly.

Each product-supporting insert may include a first wall having a first retaining interface configured to retain at least one first product having a first size and shape. The product-supporting insert may also include a second wall having a second retaining interface that differs from the first retaining interface. The second retaining interface is configured to retain at least one second product having a second size and shape that differs from the first size and shape. The product-supporting insert may also include a third wall having a third retaining interface that differs from the first and second retaining interfaces. The third retaining interface is configured to retain at least one third product having a third size and shape that differs from the first and second sizes and shapes. The product-supporting insert may also include a fourth wall having a fourth retaining interface that differs from the first, second, and third retaining interfaces. The fourth retaining interface is configured to retain at least one fourth product having a fourth size and shape that differs from the first, second, and third sizes and shapes.

In at least one embodiment, the first, second, third, and fourth walls connect to form a cube having at least one open end that allows one of the first product(s), the second product(s), the third product(s), or the fourth product(s) to be viewed. The cube is configured to be moved within the retaining chamber between a first orientation that displays the first product(s), a second orientation that displays the second product(s), a third orientation that displays the third product(s), and a fourth orientation that displays the fourth product(s).

The adjustable product display system may also include at least one suction cup assembly that is configured to removably mount the adjustable product display system to the surface of the structure. In at least one embodiment, the surface is one of an interior or exterior surface, and the structure is a transparent glass door of a refrigerated compartment.

Certain embodiments of the present disclosure provide a system for containing and refrigerating one or more products. The system may include a refrigerated compartment including a refrigerating chamber and a transparent door having an interior surface and an exterior surface. The transparent door is configured to be selectively moved between open and closed positions to expose and close the refrigerating chamber. The interior surface is positioned within the refrigerating chamber when the transparent door is in the closed position.

The system may also include an adjustable product display system mounted to one of the interior surface or the exterior surface. The adjustable product display system may include a bin assembly having an adjustable length. The bin assembly defines a retaining chamber. At least one product-supporting insert is selectively positioned in and removed from the retaining chamber. The product-supporting insert is configured to retain the product(s).

BRIEF DESCRIPTION OF THE DRAWINGS

FIG. 3 illustrates a lateral view of an adjustable product display system secured to a transparent barrier, according to an embodiment of the present disclosure FIG. 4 illustrates a perspective end view of a product-supporting insert, according to an embodiment of the present disclosure.

FIG. 5 illustrates a lateral view of an adjustable product display system trapping a product-supporting insert between a bin assembly and a transparent barrier, according to an embodiment of the present disclosure.

FIG. 6 illustrates a perspective front view of an adjustable product display system secured to an interior surface of a transparent door of a refrigerated compartment, according to an embodiment of the present disclosure.

FIG. 8 illustrates a perspective top rear view of an adjustable product display system in a retracted position, according to an embodiment of the present disclosure.

FIG. 9 illustrates a perspective top rear view of an adjustable product display system in an expanded position, according to an embodiment of the present disclosure.

FIG. 10 illustrates a perspective top view of a product-supporting insert, according to an embodiment of the present disclosure.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide an adjustable product display system that may include a bin assembly that is configured to retain one or more product-supporting inserts. The bin assembly may include first and second bins that are configured to be moveably adjusted with respect to one another. For example, the first and second bins may be configured to telescope (in and out) to various different lengths.

Each product-supporting insert may be shaped as a block or cube having four sides and two open ends. Each of the four sides may include one or more channels. Each side may be configured to support a differently-shaped product. The product-supporting inserts may be adjusted (for example, rotated) to different positions to securely retain differently-shaped products within the bin assembly. The product-supporting inserts are configured to help position products for sale, and securely retain the products in an upright display position.

Each product-supporting insert may lock in position between the bin assembly and a structural surface to which the bin assembly secures. For example, the bin assembly may include a lip that traps the product-supporting inserts in position between a surface of the bin assembly and the structural surface.

The bin assembly may be coupled to one or more suction cup assemblies that are configured to secure the system to an interior surface of a transparent door of a compartment, such as a refrigerated or freezer compartment, such as found at convenience stores, grocery stores and the like. In at least one embodiment, two suction cup assemblies may be spaced apart from one another. A first suction cup assembly may be coupled to the first bin, while a second suction cup assembly may be coupled to the second bin. Each suction cup assembly may include an interior edge that is configured to retain an end of a sign that may be secured between the suction cup assemblies.

Figure 1:
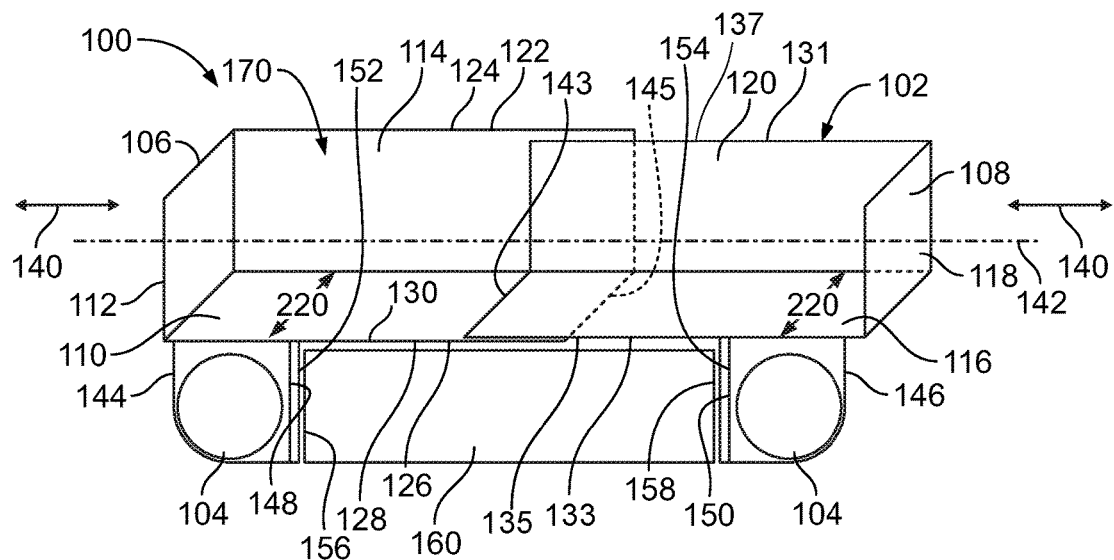
FIG. 1 illustrates a perspective front view of an adjustable product display system, according to an embodiment of the present disclosure.

FIG. 1 illustrates a perspective front view of an adjustable product display system 100, according to an embodiment of the present disclosure. The adjustable product display system 100 may include a bin assembly 102 coupled to two suction cup assemblies 104.

Figure 2:
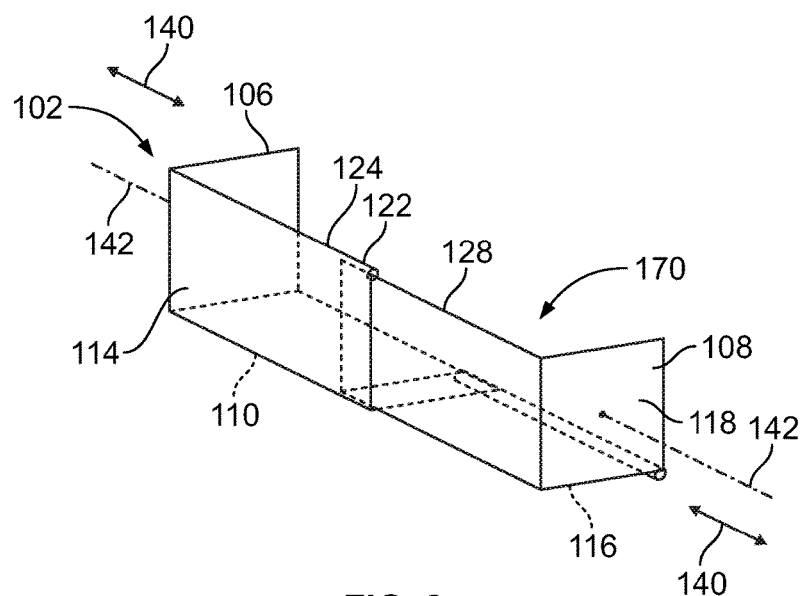
FIG. 2 illustrates a perspective rear view of a bin assembly, according to an embodiment of the present disclosure.

FIG. 2 illustrates a perspective rear view of the bin assembly 102, according to an embodiment of the present disclosure. Referring to FIGS. 1 and 2, the bin assembly 102 includes a first bin 106 adjustably secured to a second bin 108. The first bin 106 includes an insert-supporting base 110 connected to an end wall 112 and a rear wall 114. The end wall 112 and the rear wall 114 may upwardly extend from outer edges of the base 110 at right angles. Further, the end wall 112 may be orthogonal to the rear wall 114. An end of the first bin 106 opposite from the end wall 112 is open. Further, the front of the first bin 106 opposite from the rear wall 114 is open.

The second bin 108 includes an insert-supporting base 116 connected to an end wall 118 and a rear wall 120. The end wall 118 and the rear wall 120 may upwardly extend from outer edges of the base 116 at right angles. Further, the end wall 118 may be orthogonal to the rear wall 120. An end of the second bin 108 opposite from the end wall 118 is open. Further, the front of the second bin 108 opposite from the rear wall 120 is open.

The first bin 106 may include a retaining track 122 at an upper edge 124 of the wall 114 and a retaining track 126 at a front edge 130 of the base 110. The retaining track 122 may include a downwardly curved, canted, bent, or the like lip that defines a retaining channel. Similarly, the retaining track 126 may include an inwardly curved, canted, bent, or the like lip that defines a retaining channel. Optionally, the first bin 106 may not include the retaining track 126.

The retaining tracks 122 and 126 are configured to slidably receive and retain a respective upper edge 131 and a front edge 133 of the respective rear wall 120 and the base 116 of the second bin 108. Optionally, the second bin 108 may include one of the retaining tracks, such as the retaining track 135, which retains an edge portion of the base 110 of the first bin 106. Also, optionally, the second bin 108 may include both retaining tracks 135 and 137, while the first bin 106 does not include any retaining track.

The retaining tracks 122 and 126 allow the first and second bins 106 and 108 to linearly translate with respect to one another. For example, because the first bin 106 slidably retains the second bin 108, the first and second bins 106 and 108 may be adjustably moved in and out in the directions of arrows 140. The first and second bins 106 and 108 may be moved relative to one another in the directions of arrows 140, which may be parallel to a plane in which the base 110 or the base 116 resides. The directions of arrows 140 are parallel to a longitudinal axis 142 of the bin assembly 102.

In at least one embodiment, the first bin 106 may include an interior channel into which the second bin 108 is configured to be slidably positioned. As such, the second bin 108 may slidably move in and out of the first bin 106. In at least one other embodiment, the first bin 106 may be configured to slidably move in and out of the second bin 108.

Each of the first and second bins 106 and 108 may include a stop at terminal edges. For example, a lip, clasp, latch, or the like may be located at distal edges of the first and second bins 106 and 108 that limit outward spreading of the first and second bins 106 and 108. As such, the first and second bins 106 and 108 may be prevented from separating from one another. The inward range of motion of the first and second bins 106 and 108 is limited by the end walls 112 and 118 and/or the suction cup assemblies 104. For example, inward movement of the second bin 108 towards the first bin 106 is halted as the internal edge 143 of the second bin 108 abuts into the end wall 122 and/or the internal edge 145 of the first bin 106 abuts into the end wall 118.

The first and second bins 106 and 108 may slide toward and away from another, such as in a telescoping fashion. The first and second bins 106 and 108 may be spread open to accommodate an increased number of products, while the first and second bins 106 and 108 may be pushed toward another to accommodate a decreased number of products.

As shown in FIG. 1, the first bin 106 may include a suction bracket 144 extending downwardly from the front edge 130 of the base 110 proximate to the end wall 112. Similarly, the second bin 108 may include a suction bracket 146 extending downwardly from the front edge 133 of the base 116 proximate to the end wall 118. Each of the suction brackets 144 and 146 is configured to retain a suction cup assembly 104. Optionally, the suction cup assemblies 104 may include the suction brackets 144 and 146, which secure to the first and second bins 106 and 108, respectively, such as through adhesives, fasteners, joints, and/or the like. Alternatively, the suction brackets 144 and 146 may be positioned at various other locations along the bases 110 and 116. However, spreading the suction brackets 144 and 146 as far apart as possible ensures a wider range of closing motion of the first and second bins 106 and 108. For example, if the suction brackets 144 and 146 are positioned closer to one another, the suction brackets 144 and 146 abut into each other, thereby limiting closing motion.

Interior edges 148 and 150 of the respective suction brackets 144 and 146 may include respective sign retainers 152 and 154. Each sign retainer 152 and 154 may include a channel, clip, fingers, clasps, tabs/slots, and/or the like that are configured to retain respective ends 156 and 158 of a sign 160 that may be suspended between the suction brackets 144 and 146. The sign 160 may advertise products being displayed within the adjustable product display system 100.

The suction cup assemblies 104 include suction cups that are configured to removably connect the adjustable product display system 100 to a surface, such as a transparent glass surface of a refrigerated compartment. The suction cups may be formed as described in U.S. patent application Ser. No. 14/623,679, entitled "Systems and Methods for Securing and Displaying Products, filed Feb. 17, 2015, which is hereby incorporated by reference in its entirety.

In operation, the bin assembly 102 is configured to retain one or more product-supporting inserts within a retaining chamber 170 defined between the first and second bins 106 and 108. The first and second bins 106 and 108 may be moved relative to one another to a desired size (for example, length) of the retaining chamber 170. For example, the first and second bins 106 and 108 may be slid and spread apart to provide a larger retaining chamber 170, or slid and pushed toward one another to provide a smaller retaining chamber 170, depending on the amount of product that an individual desires to display.

FIG. 3 illustrates a lateral view of the adjustable product display system 100 secured to a transparent barrier 172, according to an embodiment of the present disclosure. For the sake of clarity, the end walls 112 and 118 are not shown in FIG. 3. As shown, the suction cup assemblies 104 include suction cups 174 that securely mount the adjustable product display system 100 to the transparent barrier 172, such as a glass door of a refrigerated compartment. Alternatively, the adjustable product display system 100 may include connection devices other than suction cup assemblies 104, such as hooks, latches, strings, wires, clasps, fasteners, and/or the like that are configured to securely connect the adjustable product display system 100 to a structure.

FIG. 4 illustrates a perspective end view of a product-supporting insert 180, according to an embodiment of the present disclosure. The product-supporting insert 180 includes a main cube-shaped body 182 having orthogonal walls 184, 186, 188, and 190. Opposite ends 192 and 194 of the cube-shaped body 182 are open (that is, do not include structural walls). Each of the walls 184, 186, 188, and 190 includes separate and distinct retaining interfaces, each of which may be configured to retain products having different sizes and shapes. Each retaining interface may include one or more product-retaining channels. The wall 184 may include two product-retaining channels 196 that are each configured to receive and retain a portion of a product having a first size and shape. For example, each product-retaining channel 196 may be configured to receive and retain a portion of an outer perimeter of a wrapped candy bar, a boxed ice cream bar, a wrapped food product (such as a frozen burrito, hot dog, etc.), and/or the like. Optionally, the wall 184 may include more or less than two product-retaining channels 196. Alternatively, instead of open ends, the product-supporting insert 180 may include end walls, each of which includes a retaining interface.

The wall 186 may include four product-retaining channels 198 that are each configured to receive and retain a portion of a product having a second size and shape that differs from the first size and shape. For example, each product-retaining channel 198 may be configured to receive and retain a portion of an outer perimeter of a wrapped candy bar, a boxed ice cream bar, a wrapped food product (such as a frozen burrito, hot dog, etc.), and/or the like. Optionally, the wall 186 may include more or less than four product-retaining channels 198.

The wall 188 may include one product-retaining channel 200 that is configured to receive and retain a portion of a product having a third size and shape that differs from the first and second sizes and shapes. For example, the product-retaining channel 200 may be configured to receive and retain a portion of an outer perimeter of a pint container of ice cream, a beverage container, and/or the like. Optionally, the wall 188 may include more than one product-retaining channel 200.

The wall 190 may include six product-retaining channels 202 that are each configured to receive and retain a portion of a product having a fourth size and shape that differs from the first, second, and third sizes and shapes. For example, each product-retaining channel 202 may be configured to receive and retain a portion of an outer perimeter of a wrapped candy bar, a boxed ice cream bar, a wrapped food product (such as a frozen burrito, hot dog, etc.), and/or the like. Optionally, the wall 190 may include more or less than six product-retaining channels 202.

Referring to FIGS. 3 and 4, in operation, the product-supporting insert 180 is configured to be positioned within the retaining chamber 170 of the bin assembly 102. The product-supporting insert 180 may be rotated to various different positions within the retaining chamber 170 to adjust which of the walls 184, 186, 188, and 190 is oriented as a top wall. In this manner, the product-supporting insert 180 may be adjusted between various positions to support various different products. Further, in order to display the product(s), the open ends 192 and 194 may be positioned against the transparent barrier 172 and the rear wall(s) 114 and/or 120 of the bin assembly 102. In this manner, an individual has a clear view of the product(s) being supported by the product-supporting insert 180.

The adjustable product display system 100 may be secured to an interior surface of a refrigerated container in order to refrigerate (for example, cool, chill, freeze, or the like) products supported by product-supporting inserts 180 within the bin assembly 102. Optionally, the adjustable product display system 100 may be secured to an outer surface of a structure (such as a glass door, a mirror, and/or the like) if the products (for example, candy bars) displayed therein are not to be refrigerated.

FIG. 5 illustrates a lateral view of the adjustable product display system 100 trapping a product-supporting insert 180 between the bin assembly 102 and the transparent barrier 172, according to an embodiment of the present disclosure. As shown, the product-supporting insert 180 is sized and shaped to fit between the bin assembly 102 and the transparent barrier 172. For example, the length of each wall 184, 186, 188, and 190 (shown in FIG. 4) may be the same or approximately the same length as the width 220 (shown in FIG. 1) of the bases 110 and 116. A rear edge of the top wall 224 of the product-supporting insert 180 is trapped underneath a lock, such as an upper lip 226 of the bin assembly 102. The upper lip 226 may be formed by retaining tracks of the first and/or second bins 106 and 108 (shown in FIG. 1, for example). Optionally, the upper lip 226 may be a separate and distinct lip in addition to the retaining tracks.

If a product is pulled out of the product-supporting insert 180 in the direction of arc A, which exerts a dislodging force into the product-supporting insert 180, the top wall 224 is trapped underneath the upper lip 226. While the product-supporting insert 180 may tend to pivot upwardly in the direction of arc A, any such movement causes the bottom front edge 228 of product-supporting insert 180 to abut into the transparent barrier 172, thereby preventing the product-supporting insert 180 from dislodging from the bin assembly 102. As such, the upper lip 226 and the transparent barrier 172 cooperate to restrain movement of the product-supporting insert 180. The upper lip 226 and the transparent barrier 172 lock the product-supporting insert 180 in place in order to prevent the product-supporting insert 180 from being inadvertently removed from the bin assembly 102. Alternatively, the adjustable product display system 100 may not include a lock, such as the upper lip 226, a clasp, a latch, one or more studs, bumps, nubs, or other such protuberances, or the like that are configured to cooperate with a surface to lock the product-supporting insert 180 within the retaining chamber 170.

In order to remove the product-supporting insert 180 (such as to adjust the product-supporting insert 180 into a different product-supporting orientation), the adjustable product display system 100 may be removed from the transparent barrier 172, such as a by a user pulling the adjustable product display system 100 with sufficient force to overcome the suction retaining force of the suction cups 174. After the adjustable product display system 100 is separated from the transparent barrier 172, an individual may simply pull the product-supporting insert 180 out from the bin assembly 102, such as in a direction that is parallel to a plan of the base 110 and/or 116.

FIG. 6 illustrates a perspective front view of the adjustable product display system 100 secured to an interior surface of a transparent door 250 of a refrigerated compartment 252, according to an embodiment of the present disclosure. The adjustable product display system 100 and the refrigerated compartment 252 combine to form a system 253 for refrigerating product. The refrigerated compartment 252 includes lateral walls 255 connect to a rear wall 257. The transparent door 250 moveably secures to one or both of the lateral walls 255, such as through a hinge, a sliding track, and/or the like. A refrigerating chamber 259 is defined between the lateral walls 255, the rear wall 257, a base (not shown in FIG. 6), an upper wall (not shown in FIG. 6), and the transparent door 250 (when closed). The transparent door 250 is selectively moveable between open and closed positions. In the open position, the refrigerating chamber 259 is exposed, such that an individual may reach into the refrigerating chamber. When the transparent door 250 is closed, the refrigerating chamber 259 is closed.

As shown, two product-supporting inserts 180a and 180b are secured within the retaining chamber 170 of the bin assembly 102. The suction cup assemblies 104 secure the adjustable product display system 100 to the interior surface of the transparent door 250.

The product-supporting insert 180a is oriented in a first orientation that allows a first product 260 having a first size and shape to be retained therein and displayed. The product-supporting insert 180b is oriented in a second orientation that allows a plurality of second products 262, each of which has a second size and shape that differs from the first size and shape, to be retained therein and displayed. The product-supporting-inserts 180a and 180b may be adjusted to various other positions to retain and display various other products. Further, as shown, the open ends of the product-supporting inserts 180a and 180b are oriented to expose the products 260 and 262 to an individual standing in front of the transparent door 250.

The bin assembly 102 may be adjusted to various different lengths to accommodate a greater or lesser number of product-supporting inserts 180. For example, the first and second bins 106 and 108 may be slidably spread open to accommodate additional product-supporting inserts 180. As another example, the first and second bins 106 and 108 may be slidably closed to accommodate less product-supporting inserts 180.

Figure 7:
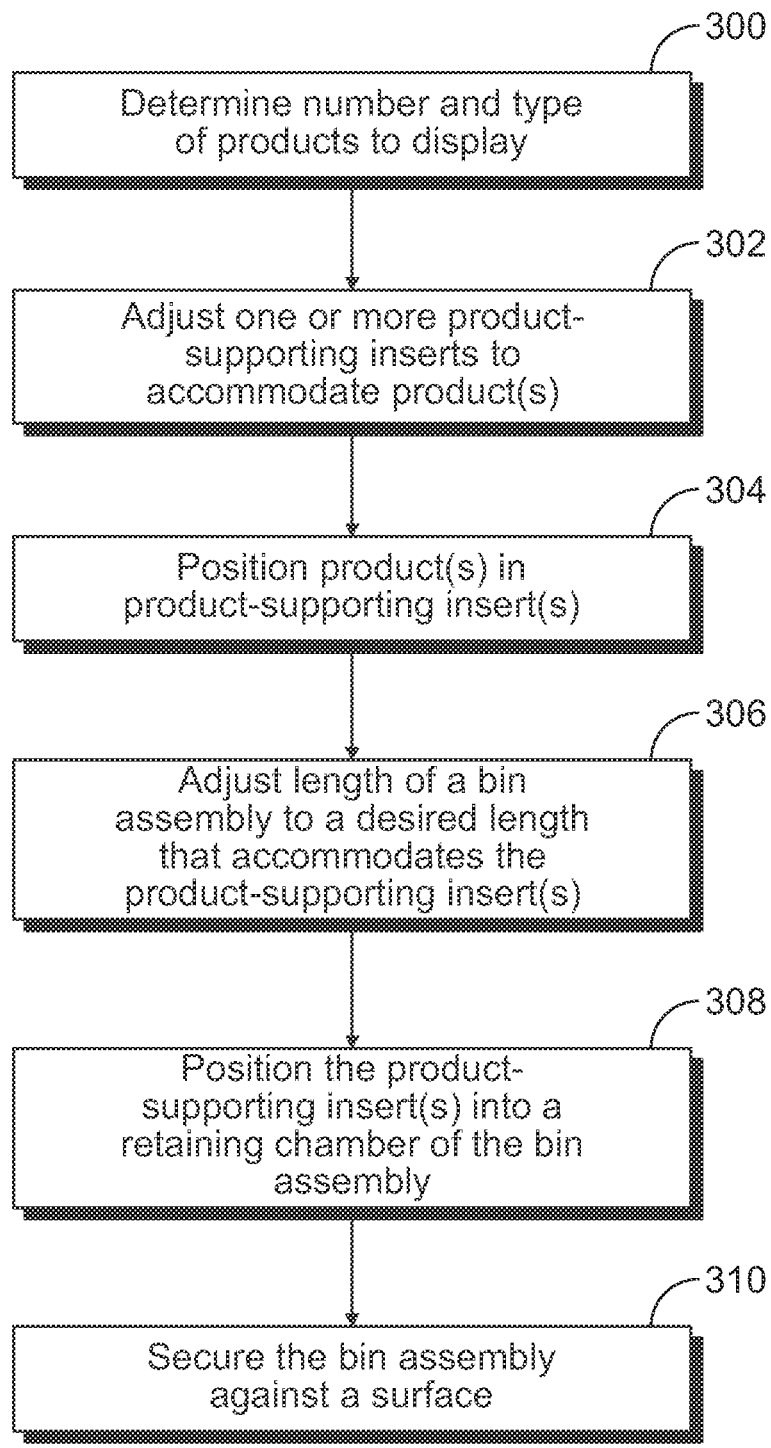
FIG. 7 illustrates a flow chart of a method of displaying products within an adjustable product display system, according to an embodiment of the present disclosure.

FIG. 7 illustrates a flow chart of a method of displaying products within an adjustable product display system, according to an embodiment of the present disclosure. The method begins at 300, in which an individual determines a number and type of products to display. At 302, one or more product-supporting inserts are adjusted to accommodate the product(s). For example, the product-supporting insert(s) may be rotated to a position to support a desired product(s) for display. At 304, the product(s) are positioned in the product-supporting insert(s). At 306, a length of a bin assembly is adjusted to a desired length that accommodates the product-supporting insert(s). At 308, the product-supporting insert(s) are positioned into a retaining chamber of the bin assembly. At 310, the bin assembly is secured against a surface (for example, an interior or exterior surface of a transparent door of a refrigerated compartment), such as through one or more suction cup assemblies. Optionally, 304 may occur between 308 and 310, or after 310.

FIG. 8 illustrates a perspective top rear view of the adjustable product display system 100 in a retracted position, according to an embodiment of the present disclosure. As shown, in the retracted position, the first bin 106 is fully closed in relation to the second bin 108. In the retracted position, the retaining chamber 170 may accommodate up to three product-supporting inserts 180. Alternatively, the bin assembly 102 may be sized and shaped to accommodate more or less product-supporting inserts 180 in the retracted position. Spaced apart locks 401, such as hooking ledges, flanges, or rims, extend from the bin assembly 102.

FIG. 9 illustrates a perspective top rear view of the adjustable product display system 100 in an expanded position, according to an embodiment of the present disclosure. The second bin 108 may include a plurality of regularly spaced notches 400 that are configured to mate with a reciprocal protuberance(s) (hidden from view), such as a tab, post, stud, or the like, extending into the retaining chamber 170 from the base 110 and/or the rear wall 114. The protuberance mates with a particular notch to secure the first and second bins 106 and 108 together at a desired length. Optionally, the first bin 106 may include the notches, while the second bin 108 includes the protuberance(s). As shown, in the expanded position, the first bin 106 may be fully extended in relation to the second bin 108. In the expanded position, the retaining chamber 170 may accommodate up to five product-supporting inserts 180. Alternatively, the bin assembly 102 may be sized and shaped to accommodate more or less product-supporting inserts 180 in the expanded position.

FIG. 10 illustrates a perspective top view of a product-supporting insert 180, according to an embodiment of the present disclosure. As shown, the product-supporting insert 180 includes four orthogonal walls 402, 404, 406, and 408, each of which may include a unique retaining interface 410, 412, 414, and 416, respectively. Each retaining interface may be configured to retain separate and distinct products having differing sizes and shapes. For example, the retaining interface 410 is configured to retain a first product having a first size and shape, while the retaining interface 412 is configured to retain a second product having a second size and shape that differs from the first size and shape.

Figure 11:
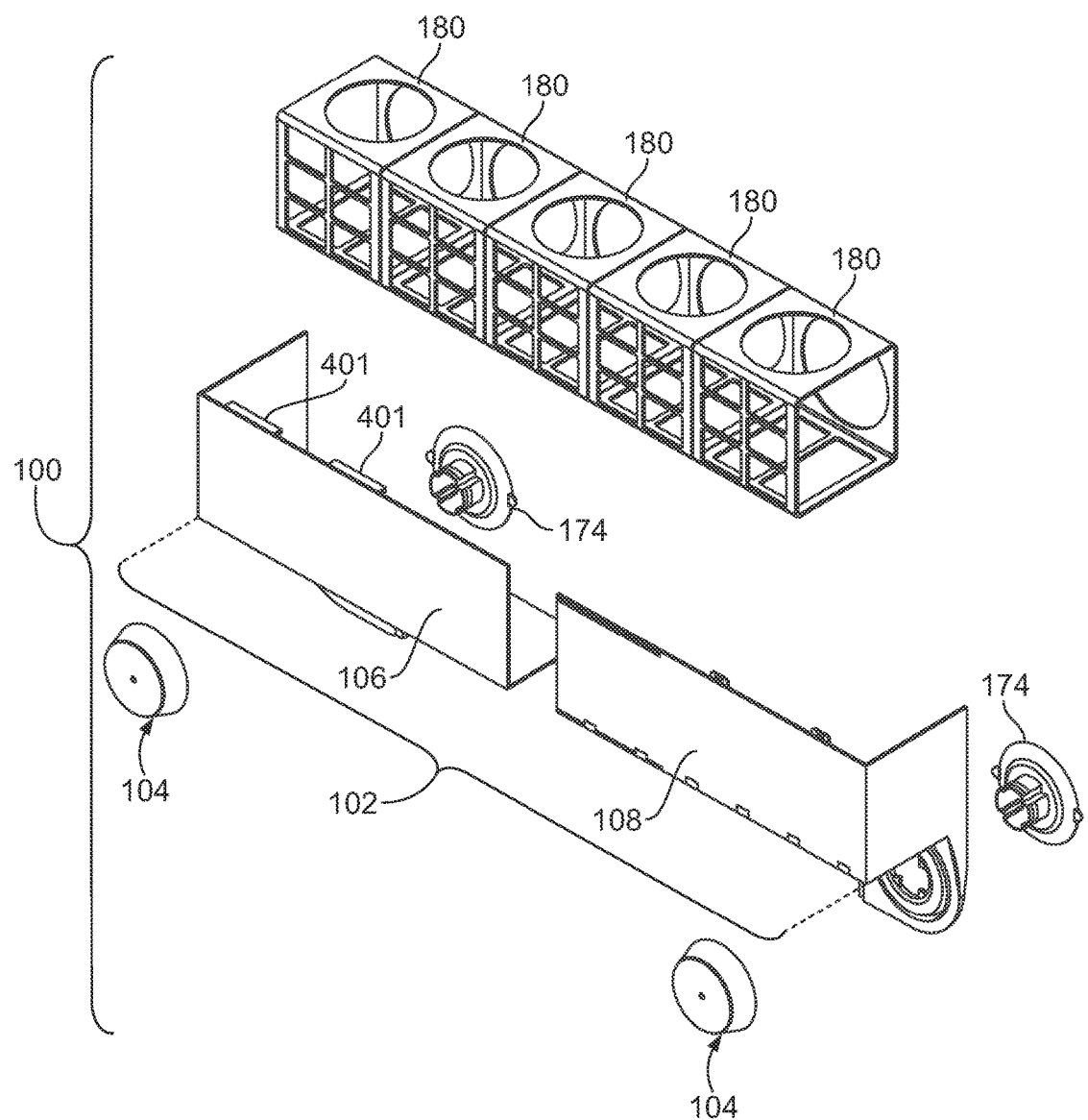
FIG. 11 illustrates a perspective top rear view of an adjustable product display system, according to an embodiment of the present disclosure.

FIG. 11 illustrates a perspective top rear view of the adjustable product display system 100, according to an embodiment of the present disclosure. As shown, the first bin 106 is configured to slide in relation to the second bin 108. Alternatively, the first and second bins 106 and 108 may be moveably connected together through various other connection interfaces, such as an accordion style connection, a pivotal swing connection, a scissor connection, and/or the like.

Referring to FIGS. 1-11, embodiments of the present disclosure provide an adjustable product display system that allows an individual to adjustably display one or more products. The adjustable product display system may be adapted to a desired number and type of products to be displayed. The adjustable product display system may be mounted to a surface of a container, thereby saving shelf space within the container for other products. Embodiments of the present disclosure provide systems and methods for accommodating and displaying increased numbers of products within a display container, such as a refrigerated compartment.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for containing and refrigerating one or more products, the system comprising:
   a refrigerated compartment including a refrigerating chamber and a transparent door having an interior surface and an exterior surface, wherein the transparent door is configured to be selectively moved between open and closed positions to expose and close the refrigerating chamber, wherein the interior surface is positioned within the refrigerating chamber when the transparent door is in the closed position; and an adjustable product display system mounted to one of the interior surface or the exterior surface, the adjustable product display system comprising:

a bin assembly having an adjustable length, wherein the bin assembly defines a retaining chamber, wherein the bin assembly comprises a first bin moveably secured to a second bin, wherein the first bin is moveable relative to the second bin to adjust a length of the retaining chamber, wherein the first bin comprises a first retaining track defining a first retaining channel at a first upper edge of a first rear wall and a second retaining track defining a second retaining channel at a first front edge of a first base, wherein the second bin comprises a second upper edge, a second front edge, and a second base, wherein the first retaining track and the second retaining track of the first bin slidably retain the second upper edge and the second front edge of the second bin, wherein the first retraining track and the second retraining track are configured to allow the first bin to linearly translate with respect to the second bin;

at least one product-supporting insert that is configured to be selectively positioned in and removed from the retaining chamber, wherein the at least one product-supporting insert has a first wall, a second wall, a third wall and a fourth wall and two open ends, wherein the first wall has a first retaining interface, wherein the first retaining interface is configured to retain at least one product that is a first size and shape, wherein the second wall has a second retaining interface that differs from the first retaining interface, wherein the second retaining interface is configured to retain at least one second product having a second size and shape that differs from the first size and shape, the third wall has a third retaining interface that differs from the first and second retaining interfaces, wherein the third retaining interface is configured to retain at least one third product having a third size and shape that differs from the first and second sizes and shapes, the fourth wall having a fourth retaining interface that differs from the first, second and third retaining interfaces, wherein the fourth retaining interface is configured to retain at least one fourth product having a fourth size and shape that differs from the first, second, and third sizes and shapes: wherein the at least one product supporting insert is configured to be positioned underneath an upper lip within the retaining chamber between a first orientation that displays the at least one first product, a second orientation that displays the at least one second product, a third orientation that displays the at least one third product, and a fourth orientation that displays the at least one fourth product; and at least one suction cup assembly that removably mounts the adjustable product display system to the interior surface or the exterior surface, wherein the at least one suction cup assembly is configured to limit the adjustable length of the bin assembly, wherein the at least one suction cup assembly is configured to retain an end of a sign.

2. The system of claim 1, wherein the bin assembly comprises at least one lock that is configured to cooperate with a structure to lock the at least one product-supporting insert within the retaining chamber.

3. The system of claim 1, wherein the first, second, third, and fourth walls connect to form a cube having the two open ends that allow one of the at least one first product, the at least one second product, the at least one third product, or the at least one fourth product to be viewed, wherein the cube is configured to be positioned underneath the upper lip within the retaining chamber between the first orientation that displays the at least one first product, the second orientation that displays the at least one second product, the third orientation that displays the at least one third product, and the fourth orientation that displays the at least one fourth product.

4. The adjustable product display system of claim 1, wherein the bin assembly is configured to telescope between different sizes.

5. The adjustable product display system of claim 1, wherein the at least one suction cup assembly is configured to limit a closing motion of the bin assembly.

6. An adjustable product display system configured to display a variety of products having different sizes and shapes, wherein the adjustable product display system is mountable to one of an interior surface or an exterior surface of a transparent door of a refrigerated compartment, the adjustable product display system comprising:

a bin assembly having an adjustable length, wherein the bin assembly defines a retaining chamber, wherein the bin assembly comprises:

a first bin moveably secured to a second bin, wherein the first bin is moveable relative to the second bin to adjust a length of the retaining chamber, wherein the first bin comprises a first retaining track defining a first retaining channel at a first upper edge of a first rear wall and a second retaining track defining a second retaining channel at a first front edge of a first base, wherein the second bin comprises a second upper edge, a second front edge, and a second base, wherein the first retaining track and the second retaining track of the first bin slidably retain the second upper edge and the second front edge of the second bin, wherein the first retraining track and the second retraining track are configured to allow the first bin to linearly translate with respect to the second bin; and at least one lock;

at least one product-supporting insert that is selectively positioned in and removed from the retaining chamber, wherein the at least one product-supporting insert is configured to retain at least one of the products, wherein the at least one lock cooperates with the interior surface or the exterior surface to lock the at least one product-supporting insert within the retaining chamber, wherein the at least one product-supporting insert comprises:

two open ends; a first wail having a first retaining interface configured to retain at least one first product having a first size and shape;

a second wall having a second retaining interface that differs from the first retaining interface, wherein the second retaining interface is configured to retain at least one second product having a second size and shape that differs from the first size and shape;

a third wall having a third retaining interface that differs from the first and second retaining interfaces, wherein the third retaining interface is configured to retain at least one third product having a third size and shape that differs from the first and second sizes and shapes;

a fourth wall having a fourth retaining interface that differs from the first, second, and third retaining interfaces, wherein the fourth retaining interface is configured to retain at least one fourth product having a fourth size and shape that differs from the first, second, and third sizes and shapes, wherein the two open ends, the first wall, the second wall, the third wall, and the fourth wall connect to form a cube that allows one of the at least one first product, the at least one second product, the at least one third product, or the at least one fourth product to be viewed, wherein the cube is configured to be moved within the retaining chamber between a first orientation that displays the at least one first product, a second orientation that displays the at least one second product, a third orientation that displays the at least one third product, and a fourth orientation that displays the at least one fourth product; and a plurality of suction cup assemblies that removably mount the adjustable product display system to an interior surface or an exterior surface of a transparent door, wherein each of the plurality of suction cup assemblies is configured to retain an end of a sign.

* * * * *